United States Patent
Du Val

(10) Patent No.: US 6,832,388 B1
(45) Date of Patent: Dec. 14, 2004

(54) PERSONAL COMPUTER USED IN CONJUNCTION WITH TELEVISION TO DISPLAY INFORMATION RELATED TO TELEVISION PROGRAMMING

(75) Inventor: Jordan Du Val, 3807 Thrush Way, Santa Clara, CA (US) 95051

(73) Assignee: Jordan Du Val, Sunnyvale, CA (US)

( * ) Notice: Subject to any disclaimer, the term of this patent is extended or adjusted under 35 U.S.C. 154(b) by 628 days.

(21) Appl. No.: 09/585,266

(22) Filed: May 30, 2000

(51) Int. Cl.[7] .......................... H04N 7/173; H04N 7/16
(52) U.S. Cl. ................... 725/110; 725/141; 725/136; 725/133
(58) Field of Search ................... 725/60, 109, 136, 725/82, 110, 61, 137, 32, 133, 141, 153, 36

(56) References Cited

U.S. PATENT DOCUMENTS

| | | | |
|---|---|---|---|
| 5,761,648 A | 6/1998 | Golden et al. | 705/14 |
| 6,018,768 A | 1/2000 | Ullman et al. | 709/218 |
| 6,326,982 B1 * | 12/2001 | Wu et al. | 345/718 |
| 6,430,743 B1 * | 8/2002 | Matsuura | 725/112 |
| 6,438,751 B1 * | 8/2002 | Voyticky et al. | 725/42 |
| 2003/0005463 A1 * | 1/2003 | Macrae et al. | 725/112 |

* cited by examiner

*Primary Examiner*—Vivek Srivastava
*Assistant Examiner*—Joseph G. Ustaris
(74) *Attorney, Agent, or Firm*—Brian Ogonowsky

(57) ABSTRACT

In one embodiment of the invention, a conventional home computer is connected via the Internet to a link broadcasting computer that is being accessed by many other households. The link broadcasting computer receives the same television signals (including ATVEF signals or other datacast signals) received by the home televisions of the various users. The link broadcasting computer detects the ATVEF signals embedded in the vertical blanking interval of each television channel and communicates to each user's home computer only the ATVEF information for the particular television channel(s) previously identified by the user. The user can then access a website identified by the information. Various options are further described herein.

25 Claims, 3 Drawing Sheets

PERSONAL COMPUTER USED IN CONJUNCTION WITH TELEVISION TO DISPLAY INFORMATION RELATED TO TELEVISION PROGRAMMING

FIELD OF THE INVENTION

This invention relates to using a computer in conjunction with a television to obtain information from the Internet pertaining to what is being displayed on the television.

BACKGROUND

Using a home computer in conjunction with a television is known. In one system, a commercially available "set top box" computer is used in conjunction with a standard television. In a related system, a particular type of television tuner card is installed in a personal computer, instead of using a set top box, to allow the computer to display television programs. These special types of computers will hereinafter be referred to as set top boxes for simplicity.

The set top box receives signals embedded in the television signal's vertical blanking interval (VBI) and processes the signals accordingly. These signals may be in accordance with the Advanced Television Enhancement Forum (ATVEF) Enhanced Content Specification. The ATVEF specification is well known, and additional information may be obtained from the Internet at www.ATVEF.com.

In one application, the ATVEF compliant set top box receives a signal in the VBI that identifies the website address (URL) of a product being advertised on the particular television channel being viewed by the user. The set top box overlays an icon in a corner of the television display alerting the viewer that more information is available by pressing a certain remote control key for the set top box. Pressing the key accesses the website identified by the ATVEF signal, and the website is then displayed on the television.

Although this technique achieves good results, it requires a special set top box or a special television tuner card for use with a personal computer. It is desirable that similar or enhanced interaction between a television and a computer be achieved using a conventional personal computer without any additional hardware. This would make it much more convenient for the user as well as reduce the cost of the system.

SUMMARY

In one embodiment of the invention, a conventional home computer, or other communications device, is connected via the Internet to a link broadcasting computer that is also being accessed by many other households. All computers accessing the link broadcasting computer will be referred to as remote computers. Typically, the user will be watching television in the same room that the remote computer is located. The user uses a mouse or keyboard for the remote computer to identify the television channel being presently watched by the user, and this information is transferred over the Internet to the link broadcasting computer. The link broadcasting computer receives the same television signals (including ATVEF signals) received by the home televisions of the various users. The link broadcasting computer detects the ATVEF signals embedded in the vertical blanking interval (VBI) of each television channel and communicates to each user's computer only the ATVEF information for the particular television channel previously identified by the user.

The user's computer then displays, in any suitable format, the transmitted ATVEF information (e.g., a URL plus a title or brief description). The user can then click, using a conventional mouse, the display on the user's computer corresponding to a particular ATVEF item to automatically address a website, for example, identified by the ATVEF signals. In one embodiment, the system of the above-described invention displays key words describing the advertisement or other item associated with the ATVEF signals so the user can readily identify the subject matter of the associated website. The information transmitted by the link broadcasting computer and displayed on the user's computer can be in any format selected by the user.

In another embodiment, any selected datacast, not just ATVEF signals, within a television or radio signal (digital or analog) is provided to the user by the link broadcasting computer. The user's "remote" computer can be any device that can access the Internet. Examples include cell phones, "smart" phones, personal digital assistants (PDA), or any Internet appliance. Additionally, information from the link broadcasting computer other than embedded signals may be transmitted to the remote computer.

Various options (e.g., scan mode, auto-record) are further described herein.

DETAILED DESCRIPTION

Figure 1:
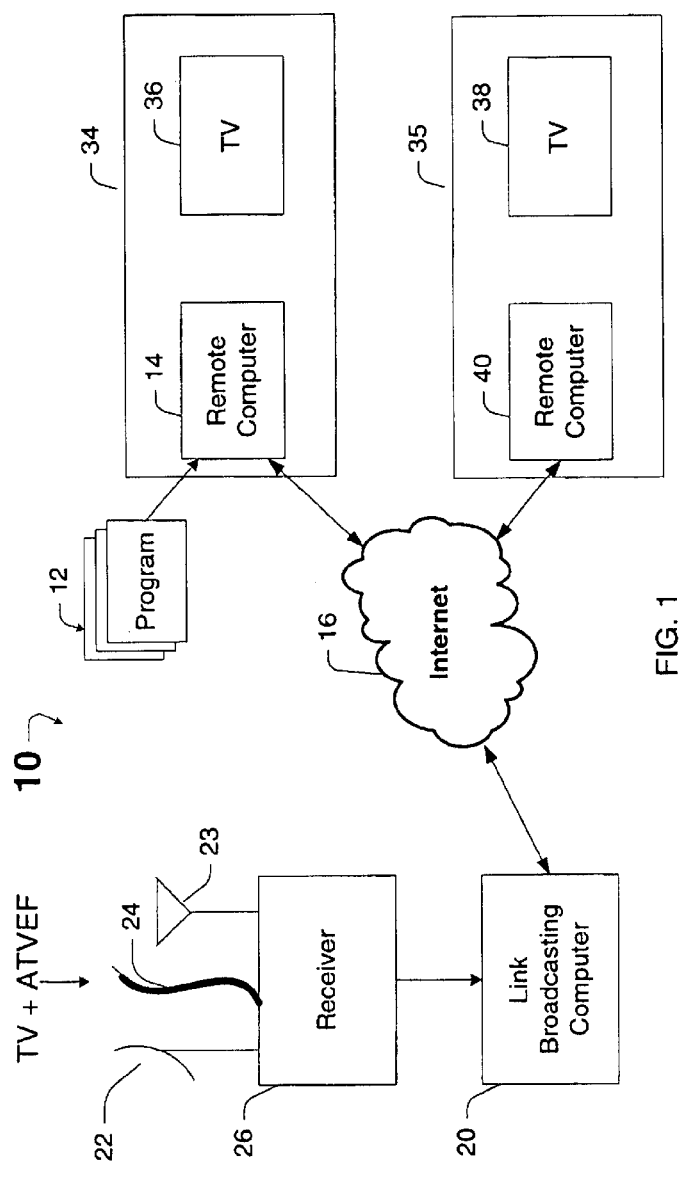
FIG. 1 illustrates a system in accordance with one embodiment of the invention.

FIG. 1 illustrates one embodiment of a system 10 incorporating the invention. An application program 12 for supporting the invention is either downloaded from a website of a supplier of the program over the Internet or supplied via a CD ROM, microdiskette, or any other means.

A remote computer 14 is connected via a modem, high bandwidth connection (e.g., DSL), cable, fiber optics, or any other known link in order to access the Internet 16. In the example given, the remote computer 14 is a conventional personal computer in the user's home. However, the computer 14 can be any computing device that can access the Internet, such as a cell phone, a "smart" phone, a PDA, or any Internet appliance.

The remote computer 14 addresses a website that provides information generated by a link broadcasting computer 20. The user may address the website using conventional techniques, such as by clicking on an icon displayed by the remote computer 14. The link broadcasting computer 20 may be any conventional computer, such as a web server computer.

The link broadcasting computer 20 receives conventional television signals broadcast via satellite, cable, local radio transmission, or other type of transmitter. A satellite dish 22, conventional television antenna 23, and cable 24 are shown as examples connected to a receiver 26. The receiver may be one or more cards physically located inside the link broadcasting computer. These signals are then demultiplexed, as necessary, and any ATVEF signals in the VBI are separated and processed using conventional techniques. Such conventional techniques may be those performed by existing set top boxes, such as WebTV™ set top boxes that are programmed to remove the ATVEF signal and process the signal, or those techniques performed by a computer having a commercially available television tuner card that separates and processes the ATVEF signals. Television cards for home computers are readily available, such as from ATI Technologies, Inc., Hauppauge, Inc., or TeraLogic, Inc. Microsoft ships "WebTV for Windows" with Windows 98; the software can extract and decode ATVEF information from a television tuner card. A separate, commercially available ATVEF decoder may exist outside of the commercially available computer 20, but is considered to be part of the computer 20 for purposes of this disclosure.

Figure 2:
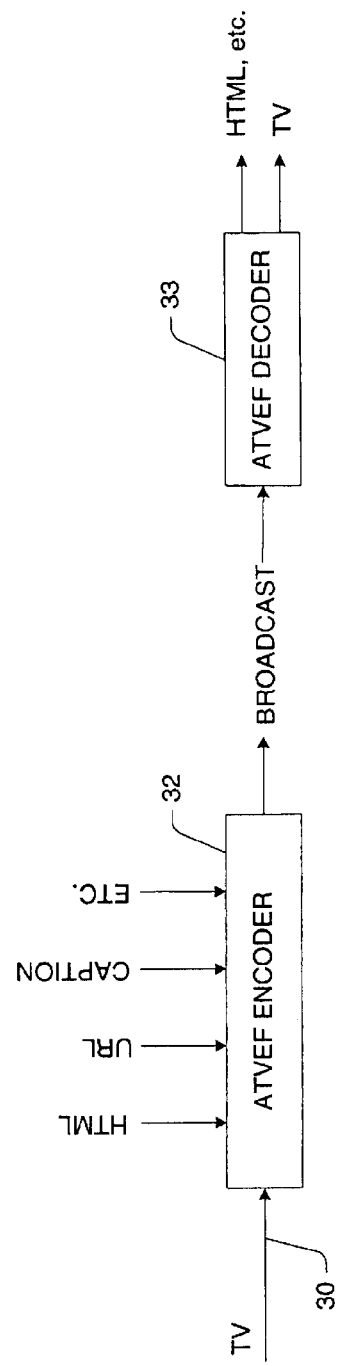
FIG. 2 illustrates the prior art encoding of additional information, such as HTML information, along with the standard television signal that is broadcast to the public.

FIG. 2 illustrates the conventional prior art encoding of a television signal 30 with any other information using a conventional ATVEF encoder 32 for transmitting the TV signal along with the other information embedded in the VBI. Such ATVEF encoders 32 are well known and commercially available. Such additional information to be embedded in the VBI include an HTML such as a webpage, a URL (Universal Resource Locator) address signal, captioning information, or any other information. The technique performed by FIG. 2 is performed by the television broadcasters. A conventional ATVEF decoder 33 removes the ATVEF information from the television signal.

The link broadcasting computer 20 broadcasts over the Internet 16 the information in the ATVEF signal (and possibly other information) for the particular channel that each user is viewing. The invention applies to any datacast (digital or analog) information received by the link broadcasting computer 20. Details of this technique are presented below.

Figures 3, 4:
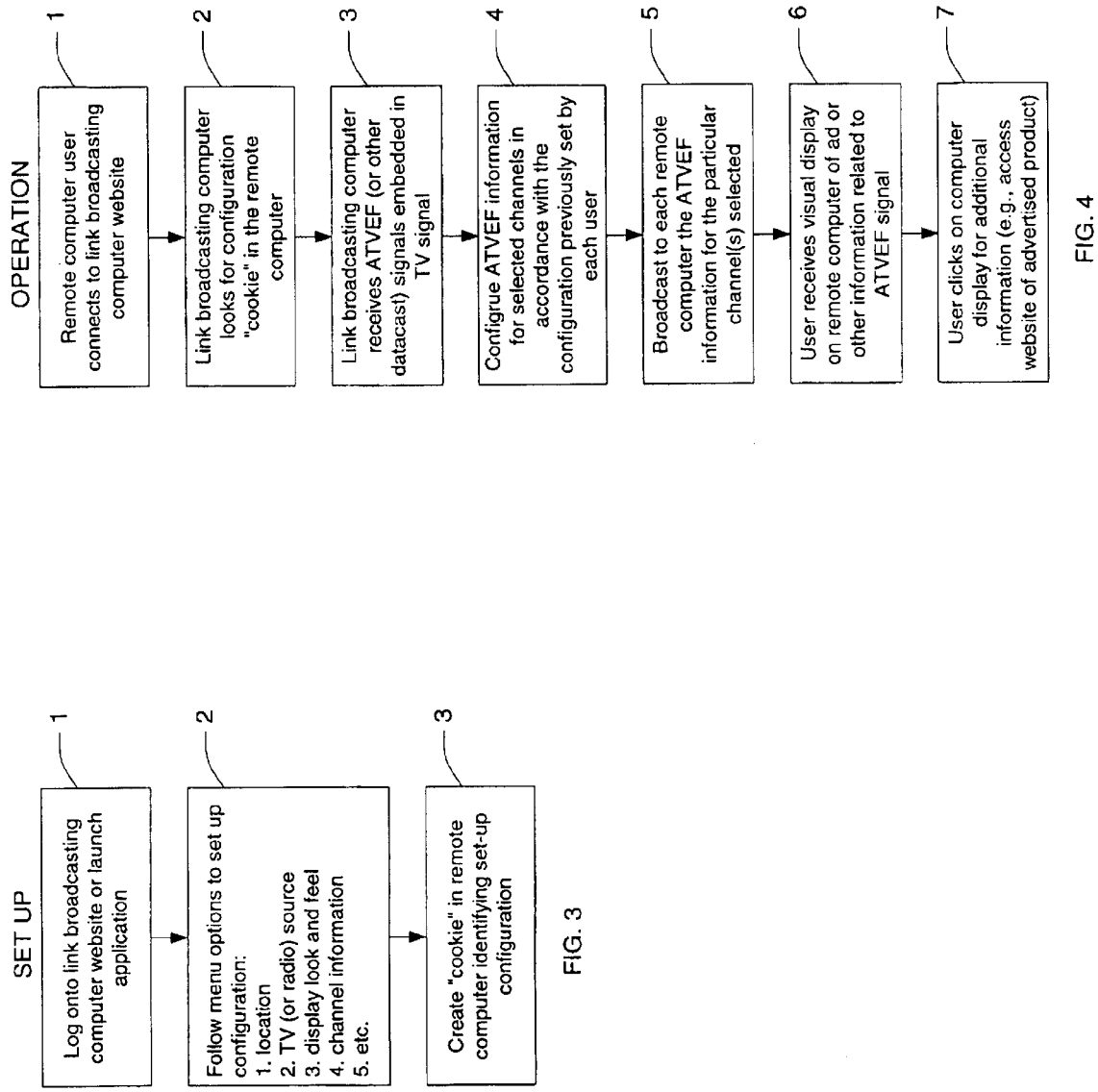
FIG. 3 is a flowchart of the set up procedure that may be used upon initialization of the system.
FIG. 4 is a flowchart of one embodiment of the operation of the system.

FIG. 3 is a flowchart of one embodiment of a set up procedure for setting up the transfer of information between the remote computer 14 and the link broadcasting computer 20.

In step 1 of FIG. 3, the user logs onto the link broadcasting computer 20 website either using conventional techniques, such as by typing in the address or clicking on an icon, or using a custom application installed in the remote computer 14. The user's computer 14 may launch the application within a browser to communicate with the link broadcasting computer 20 over the Internet.

In step 2, the link broadcasting computer 20 guides the user through the set up process using various menus. In one embodiment, the user is required to enter the geographical location of the user's home since the geographical location serves to identify the television signals received by the user's television. The user may also be required to enter the source of television signals, such as a particular cable network, satellite company or conventional broadcast since such information also identifies the television signals received by the user's television. In one embodiment, the link broadcasting computer 20 also monitors radio signals for datacasts and selectively sends the datacasts to the user via the Internet.

The user may also identify the look and feel of the display on the remote computer 14 and further customize the type of information the user wishes to be displayed on the home computer.

In step 3, the link broadcasting computer 20 then transmits back to the remote computer 14, for storage in a "cookie," a user ID code (or any suitable information) that can be used by the link broadcasting computer 20 to identify the set up configuration so that the user need not perform the complete set up each time the user logs onto the link broadcasting computer 20. The use of "cookies" is well known. A cookie is a small file automatically downloaded onto a computer which is automatically accessed at a later time by a remote computer.

In addition to the one-time set up of the system, the user also supplies, at any time, the identification of the particular television channel the user is presently viewing (or for which the user desires the transmitted ATVEF or other datacast information). This channel information may be entered using a keyboard or by clicking a channel selector displayed on the remote computer 14.

FIG. 4 illustrates one embodiment of the method carried out by system 10 after the set-up.

In step 1 of FIG. 4, the application program 12 (FIG. 1) is launched and the remote computer 14 user connects to the link broadcasting computer's 20 website.

In step 2, the link broadcasting computer 20 searches on the remote computer 14 for the cookie. If the cookie is found, the customized configuration is carried out. The web browser is responsible for storing cookies and for sending the appropriate cookie to the link broadcasting computer 20. If the cookie is not found, a set up screen is displayed for the user to set up the system.

In step 3, the link broadcasting computer 20 being serviced, which receives all television and ATVEF signals for the geographic areas being serviced, detects and processes the ATVEF signals. Any other datacast can be received and processed. The ATVEF or other datacast information may also be transmitted to the link broadcasting computer 20 by the originator of the information prior to the public broadcast. Also, an operator may perform a real-time "manual" insertion, such as by typing URLs, related to the television programming.

In step 4, the link broadcasting computer 20 configures the ATVEF information desired by each user in accordance with the configuration previously set by each user.

In step 5, the link broadcasting computer 20 broadcasts to each remote computer 14 the ATVEF information for the particular television channel being watched. Two homes 34 and 35 are illustrated in FIG. 1, for example, with the user in home 34 viewing channel 2 on the television 36 and the user in home 35 viewing channel 4 on the television 38. In step 5, the link broadcasting computer 20 transmits the ATVEF signals (and other URLs) from channel 2 to the remote computer 14 and transmits the ATVEF signals (and other URLs) from channel 4 to the remote computer 40.

In step 6, the user receives a visual display of this URL information on the user's computer 14, 40.

In step 7, the user optionally selects the URL information identified on the user's computer 14, 40 to access a website or to otherwise obtain additional information relating to the television program or advertisement.

Figure 5A:
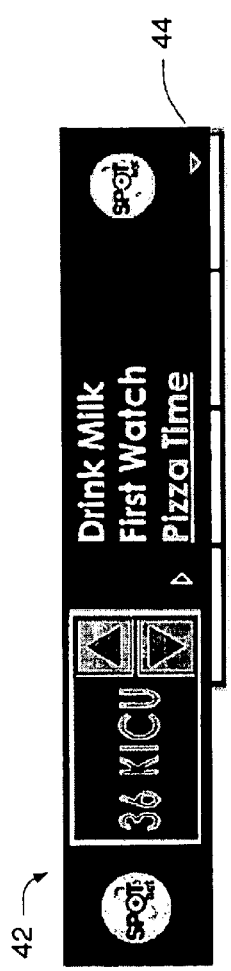
FIGS. 5A and 5B illustrate a remote computer display.
Figure 5B:
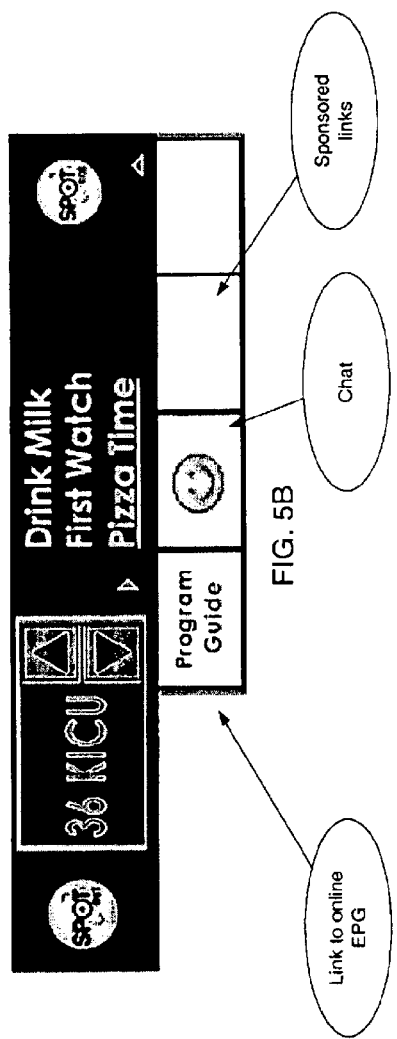

FIGS. 5A and 5B illustrate possible displays for the remote computer 14, 40. The display includes a channel selector area 42 and a key word list of the various URL items. The list can be made as long as the user wants by selecting a particular configuration. The user may simply click on a particular key word to access the website or other information regarding that item. Additionally, any related links may be identified by additional icons that may appear. For example, FIG. 5A shows the basic display, while FIG. 5B shows additional information (e.g., links) displayed simply by clicking on the toggle "button" 44.

The above system can be adapted for many additional capabilities. For example, the link broadcasting computer 20 may keep track of the channels and times input by the user to identify the user's viewing habits and habits of selecting particular ATVEF items (e.g., websites). The link broadcasting computer 20 may then automatically access these webpages, without the user specifically requesting the webpages, and the webpages can be automatically downloaded to the user's computer before or during the television programming. Since television advertising is scheduled ahead of time, link broadcasting computer 20 may receive a list of these ads and ATVEF signals ahead of time. When the viewer then requests an ad enhancement (e.g., a web page), it can be displayed instantly without having to fetch it across the web. One way to perform this operation is for the user's computer 14, 40 to automatically connect to the link broadcasting computer 20 periodically and request the material to be cached for the next 24 hours.

Alternatively, the link broadcasting computer can use an HTML extension called Channel Definition Format (CDF) which allows a server to bundle a set of webpages together and send them out all together. When a user requests an enhancement of an ad, the server can bundle together enhancements (e.g., all the ads for a particular television show) and send them out in one CDF package.

In one embodiment, the user can select a scan mode that obtains all or selected datacast information from all channels being monitored by the link broadcasting computer 20. This scan mode may be selected by selecting a certain channel (e.g., channel 99). The user may search for a particular datacast by inputting key words to the link broadcasting computer 20. This is particularly useful when the datacast contains closed captioning. Such a scan mode also gives rise to an auto-record mode, where, when the user clicks on an icon, the remote computer will automatically record any broadcast signal that uses the selected key words for later playback.

The invention can be used for any broadcast, such as conventional radio or Internet radio.

The invention finds additional utility when the ad provider supplies incentives for viewing an ad enhancement. Such incentives may be the downloading of coupons for a period of time or other beneficial features.

Substantial revenue may be obtained from not only the fee for the application program 12 (FIG. 1) running on the user's computer 14 but for advertising displayed to the user originally generated by the link broadcasting computer 20 (not from the ATVEF signals). Further, a surcharge paid by the advertisers to the owner of the link broadcasting computer 20 can be collected based on the number of hits of the ad provider's website.

Another benefit of this system is that the URL that may be delivered to the user's computer 14 in response to a particular ATVEF signal may be complex or may have normally required multiple clicks, starting from a "home" webpage, to access the particular webpage. With this present system, the URL presented to the user's computer 14 may identify any webpage.

Further, the operator of the link broadcasting computer 20 may entice advertisers to pay for customized ads. Thus, even though the ATVEF information may simply identify a URL address, the system may automatically customize the particular webpage for each particular user. Such a technique may simply cross-reference the advertiser's URL with a different URL maintained by the owner of the link broadcasting computer 20 system that contains a customized webpage.

Additionally, the information displayed on the user's computer 14 may not be in response to the ATVEF signal but may be in response to anything that the link broadcasting computer 20 is directed to send to the user regarding the particular television program being viewed. This additional information may be the URL of a particular television station broadcasting so that the user may readily provide comments on the TV program's content or obtain tickets to the TV show, etc.

The software programs needed to implement the invention are simple and can be created without undue experimentation.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a system connected to a communications network, said system including a shared computer that communicates with a plurality of remote computers, said method comprising:

receiving television signals, by said shared computer, for a plurality of television channels, said television signals for at least some of said channels containing first data in an embedded datacast;

receiving by said shared computer a current channel identifier entered into application software running on a remote computer by a user selecting the current channel identifier via a user interface;

receiving a unique user ID code, by said shared computer, from at least some of the remote computers, each remote computer transmitting a different user ID code;

associating each unique user ID code, by said shared computer with configuration information stored at the shared computer;

processing said first data by said shared computer for said plurality of television channels, including for said current channel identified by said user;

configuring the first data, by said shared computer, in accordance with the configuration information associated with the unique user ID code; and transmitting to said remote computer from said shared computer, via the communications network, information regarding said first data for said current channel identified by said user, configured in accordance with the configuration information associated with the unique ID code for the remote computer.

2. The method of claim 1 wherein said embedded datacast is an ATVEF signal within a vertical blanking interval (VBI) of a television signal.

3. The method of claim 1 wherein said communications network is the Internet.

4. The method of claim 1 wherein said first data are URLs.

5. The method of claim 1 wherein said remote computer is a personal computer.

6. The method of claim 1 wherein said remote computer is a personal digital assistant.

7. The method of claim 1 wherein said remote computer is a cellular telephone.

8. The method of claim 1 wherein said remote computer is a telephone.

9. The method of claim 1 wherein said shared computer is a web server.

10. The method of claim 1 wherein said step of transmitting comprises transmitting ATVEF signals.

11. The method of claim 1 wherein said step of transmitting includes transmitting descriptive words relating to said first data.

12. The method of claim 1 wherein said step of transmitting includes transmitting said information substantially simultaneously with said first data being received by said shared computer.

13. A method performed by a system connected to a communications network, said system including a remote computer, said method comprising:
   connecting to a shared computer via said communications network;
   receiving television signals for a plurality of television channels by said shared computer, said television signals for at least some of said channels containing first data in an embedded datacast:
   entering current channel identifier into application software running on the remote computer by a user selecting the current channel identifier via a user interface;
   transmitting data by said remote computer to said shared computer identifying the current channel selected by the user of the said remote computer;
   receiving a unique user ID code by the shared computer from at least some of the remote computers, each remote computer transmitting a different user ID code;
   associating each unique user ID code by the shared computer with configuration information stored at the shared computer;
   configuring the first data for the current channel selected by the user by the shared computer in accordance with the configuration information associated with the unique user ID code;
   receiving by said remote computer from said shared computer first data for the current channel selected by the user, configured in accordance with the configuration information associated with the unique ID code for said remote computer, from an embedded datacast received by said shared computer from signals within a television signal; and
   displaying information on said remote computer relating to said first data transmitted by said shared computer.

14. The method of claim 13 wherein said embedded datacast is an ATVEF signal within a vertical blanking interval (VBI) of a television signal.

15. The method of claim 13 wherein said communications network is the Internet.

16. The method of claim 13 wherein said first data are URLs.

17. The method of claim 13 wherein said remote computer is a personal computer.

18. The method of claim 13 wherein said remote computer is a personal digital assistant.

19. The method of claim 13 wherein said remote computer is a cellular telephone.

20. The method of claim 13 wherein said remote computer is a telephone having a display.

21. The method of claim 13 wherein said shared computer is a web server.

22. The method of claim 13 wherein said step of receiving comprises receiving ATVEF signals.

23. The method of claim 13 wherein said step of receiving includes receiving descriptive words relating to said first data.

24. The method of claim 13 wherein said step of receiving includes receiving said first data substantially simultaneously with said first data being received by said shared computer.

25. A set of computer instructions in a tangible medium, said instructions for controlling a computer to carry out the following steps:
   receiving television signals, by a shared computer, for a plurality of television channels, said television signals for at least some of said channels containing first data in an embedded datacast;
   receiving a unique user ID code by the shared computer from a plurality of remote computers, each remote computer transmitting a different user ID code;
   associating each unique user ID code by the shared computer with configuration information stored at the shared computer;
   configuring the first data by the shared computer in accordance with the configuration information associated with the unique user ID code;
   processing said first data by a share computer, communicating with a plurality of remote computers, for said plural of television channels;
   receiving data by said shared computer from said remote computer, said data comprising information identifying the current channel selected by each user of the said remote computer, the current channel being entered into application software running on a remote computer by an associated user selecting the current channel identifier via a user interface; and
   transmitting to each remote computer from said shared computer, via a communications network, information regarding said first data for the current channel selected by the user, configured in accordance with the configuration information associated with the unique ID code for each remote computer.

* * * * *